United States Patent
Martin

(10) Patent No.: US 9,926,767 B2
(45) Date of Patent: Mar. 27, 2018

(54) STRESS REACTIVE VALVE

(75) Inventor: Adam Harold Martin, Addison, TX (US)

(73) Assignee: Halliburton Energy Services, Inc., Houston, TX (US)

(*) Notice: Subject to any disclaimer, the term of this patent is extended or adjusted under 35 U.S.C. 154(b) by 282 days.

(21) Appl. No.: 14/422,211

(22) PCT Filed: Aug. 20, 2012

(86) PCT No.: PCT/US2012/051598
§ 371 (c)(1),
(2), (4) Date: Feb. 18, 2015

(87) PCT Pub. No.: WO2014/031096
PCT Pub. Date: Feb. 27, 2014

(65) Prior Publication Data
US 2015/0176368 A1    Jun. 25, 2015

(51) Int. Cl.
*E21B 34/04* (2006.01)
*E21B 34/06* (2006.01)
*F16K 17/40* (2006.01)

(52) U.S. Cl.
CPC .......... *E21B 34/045* (2013.01); *E21B 34/063* (2013.01); *F16K 17/403* (2013.01); *Y10T 137/1632* (2015.04); *Y10T 137/1789* (2015.04)

(58) Field of Classification Search
CPC .... F16K 17/403; E21B 34/063; E21B 34/045; Y10T 137/1632; Y10T 137/1789
(Continued)

(56) References Cited

U.S. PATENT DOCUMENTS 4,031,960 A    6/1977  Dudley
4,405,014 A    9/1983  Talafuse
(Continued)

FOREIGN PATENT DOCUMENTS

GB    2437657 A    10/2007
WO    2013070805 A1    5/2013

OTHER PUBLICATIONS

International Search Report and Written Opinion issued in related PCT Application No. PCT/US2012/051598 dated Mar. 21, 2013, 12 pages.
(Continued)

*Primary Examiner* — Craig Schneider
*Assistant Examiner* — P. Macade Nichols
(74) *Attorney, Agent, or Firm* — John Wustenberg; Baker Botts L.L.P.

(57) ABSTRACT

A stress reactive valve includes a valve body disposed in a subsea safety system or other elongated components of hydrocarbon production systems. The valve body includes a frangible or breakable material such that when the subsea safety system or other elongated system undergoes a stress, such as a bending stress, the frangible valve body can react to the stress by breaking and thereby establishing fluid communication or a fluid path across the valve body. In a first or unbroken condition of the valve body, the valve body prevents fluid communication between a fluid inlet and a fluid outlet. In a second or broken condition of the valve body, fluid communication is allowed between the fluid inlet and outlet. The fluid communication can be used to actuate a device, or the fluid pressure can be used as pilot pressure to actuate a pilot operated valve system.

20 Claims, 13 Drawing Sheets

(58) Field of Classification Search
USPC .................................................... 137/67–71
See application file for complete search history.

(56) References Cited

U.S. PATENT DOCUMENTS

| | | | | |
|---|---|---|---|---|
| 4,519,457 | A | * 5/1985 | Holland | ............... E21B 34/06 |
| | | | | 166/317 |
| 4,967,842 | A | 11/1990 | Franceschini et al. | |
| 5,575,336 | A | 11/1996 | Morgan | |
| 5,979,561 | A | 11/1999 | Edwards et al. | |
| 6,186,159 | B1 | 2/2001 | Degood et al. | |
| 6,386,291 | B1 | 5/2002 | Short et al. | |
| 2002/0185276 | A1 | 12/2002 | Muller et al. | |
| 2013/0105175 | A1* | 5/2013 | Mailand | ............... E21B 34/06 |
| | | | | 166/373 |

OTHER PUBLICATIONS

Extended European Search Report dated May 11, 2016 in related European Application No. 12883257.3 (6 pages).
Office Action dated Apr. 19, 2016 in related Singapore Application No. 11201501029S (5 pages).

* cited by examiner

STRESS REACTIVE VALVE

CROSS-REFERENCE TO RELATED APPLICATION

This application is a U.S. National Stage Application of International Application No. PCT/US2012/051598 filed Aug. 20, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wellbores are sometimes drilled into subterranean formations containing hydrocarbons to allow recovery of the hydrocarbons. In some situations, the wellbore is drilled in a seabed from a vessel at the sea surface. The wellbore is also produced through the fluid connection between the subsea wellhead and the surface vessel. A production tubing may be used in the subsea well for purposes of communicating produced well fluids from subterranean formations of the well to equipment at the sea floor. The top end of the production tubing may be threaded into a tubing hanger that, in turn, is seated in a well tree for purposes of suspending the production tubing inside the well.

For purposes of completing a subsea well and installing the production tubing, the production tubing typically is lowered into a marine riser string that extends from a surface platform, such as the surface vessel, down to the subsea equipment (a well tree, blowout preventer (BOP), etc.) that defines the sea floor entry point of the well. The marine riser string forms protection for the production tubing and other equipment (described below) that is lowered into the subsea well from the platform. At the sea surface, the top end of the production tubing is coupled to (threaded to, for example) a tubing hanger that follows the production tubing down through the marine riser string. A tubing hanger running tool is coupled between the tubing hanger and a landing string, and the landing string is lowered down the marine riser string to position the tubing hanger running tool, tubing hanger and production tubing in the well so that the tubing hanger lands in, or becomes seated in, the subsea well head.

The production tubing can now be used to communicate produced hydrocarbons from the well to the surface platform, or to communicate injection fluids from the surface platform to the well in cases of well intervention or other remedial operations. During these operations, the strings and tubing between the surface platform and the well can experience forces and stresses. For example, the surface platform may experience lateral rig heave or another unknown impact that shifts the surface platform relative to the wellhead. Surface platform positioning devices may work improperly and cause the surface platform to move laterally relative to the wellhead. Other such events that compromise the position of the surface platform over the wellhead can also create stresses in the strings and tubing coupled between the surface platform and the wellhead.

SUMMARY

In an embodiment, a subsea valve comprises a housing disposed in a subsea wellhead component, at least one chamber in the housing, a chamber inlet, a chamber outlet, and a valve body disposed in the chamber between the chamber inlet and the chamber outlet. The valve body comprises a frangible material reactive to a stress in the housing. The stress may comprise a bending stress, a torsional stress, a tensile stress, a shear stress, an impulse load, or any combination thereof in a string coupled to the subsea wellhead component. The chamber inlet may be fluidly coupled to a high pressure fluid, and the chamber outlet may be coupled to a hydraulic line of a valve in the subsea wellhead component. The chamber inlet may be isolated from the chamber outlet by the valve body in a closed position, and the chamber inlet may be exposed to the chamber outlet in an open position, where the valve body is broken in response to the stress in the open position. The valve body may further comprise a reduced diameter portion, and the reduced diameter portion may be breakable in response to the stress. The valve body may further comprise a stress concentration portion configured to break in response to the stress. The subsea valve may also include a pilot piston assembly coupled to the chamber outlet. The subsea valve may also include a piston shuttle valve assembly configured to receive a pilot pressure from the chamber outlet. The valve body may further comprise a pass-through hydraulic line coupled to a valve in the subsea wellhead component.

In an embodiment, a valve comprises a housing, a plurality of valve bodies, a high pressure fluid line coupled to each chamber, and a valve hydraulic line coupled to each chamber of each of the plurality of bores and isolated from the high pressure fluid line by the valve body. One or more of the plurality of valve bodies are captured in a chamber of each of a plurality of bores, where the bores are disposed in the housing. One or more of the valve bodies are breakable in response to a stress applied to the housing, where the valve body comprises an open position when broken. The valve body may further comprise a reduced diameter stress concentration portion to receive the break in the open position. The valve may also include a pilot piston assembly coupled into the valve hydraulic line. The valve may also include a piston shuttle valve disposed between an atmospheric chamber and a source pressure.

In an embodiment, a method of actuating a valve comprises isolating a fluid line from a hydraulic valve line using a valve body that is disposed in a housing, applying a stress to the valve body from the housing, breaking the valve body in response to the stress application, and establishing fluid communication between the fluid line and the hydraulic valve line through the break in the valve body. The method may also include closing a valve based on the fluid communication. The fluid communication may provide a fluid flow from the hydraulic valve line into the fluid line. The method may also include creating a pressure differential across a valve using the fluid communication and an atmospheric chamber. The method may also include biasing a valve while equalizing a pressure across a valve using the fluid communication. The method may also include operating a pilot piston using a high pressure fluid provided by the fluid communication. The method may also include exposing a valve in a subsea wellhead component to the high pressure fluid through the pilot piston, and closing the valve.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
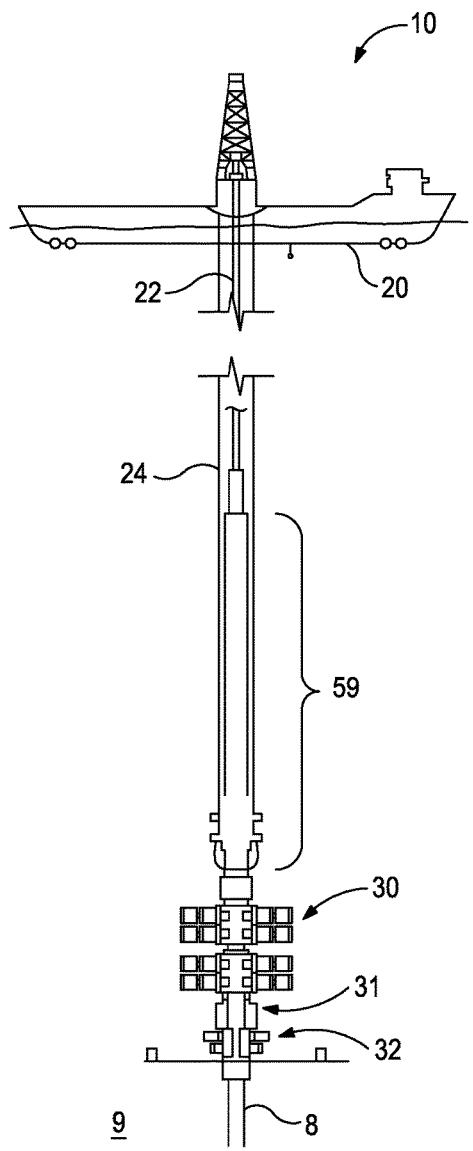
FIG. 1 illustrates a schematic view of an embodiment of a subsea formation, wellbore, and surface vessel operating environment, with a marine riser string and a landing string coupled between the surface vessel and a subsea wellhead.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "above" meaning toward the surface of the wellbore and with "down," "lower," "downward," or "below" meaning toward the terminal end of the well, regardless of the wellbore orientation. The term "source pressure" may be used to describe any pressure state which could be used to hydraulically or pneumatically actuate a device, including but not limited to: hydrostatic annulus pressure, applied pressure via a pump or regulated pump, hydraulic pressure via gas charge, accumulated gas pressure, atmospheric pressure, a low pressure region or a low pressure chamber. The various characteristics mentioned above, as well as other features and characteristics described in more detail below, will be readily apparent to those skilled in the art with the aid of this disclosure upon reading the following detailed description of the embodiments, and by referring to the accompanying drawings.

During operation of a subsea wellbore, various events may occur that require isolation of the wellbore. Various types of equipment are typically used to isolate the wellbore in the event of an emergency such as a storm that displaces the production platform or a sudden catastrophic event such as an explosion. For example, various isolation and safety valves can be used to shut off a production or completion string, and shear rams can be used to sealingly crimp the production tubing in the event that the isolation valves fail. However, the various types of isolation equipment may require control signals to operate, and even with the appropriate control signals, the equipment may take minutes to hours to fully actuate. The reliance on a control signal or input also implies that an operator or control system is operating correctly to provide the appropriate signal. Should the wellbore need to be isolated quickly or a control system fail to operate properly, an alternative or redundant safety system or device may be useful.

In order to provide an additional layer of safety, a valve is disclosed herein that can provide a passive shutdown option should various operating parameters (ie. stress levels within the landing string) be exceeded. The valve generally comprises a breakable body that separates an inner fluid or fluid pressure from an outer fluid or fluid pressure. The body may respond to various stresses such as bending forces, rotational forces, or shear forces to break, thereby providing a fluid communication pathway between the inner fluid and outer fluid. Consequently, embodiments of the valve may be referred to herein as a stress reactive or responsive valve.

The fluid communication can then be used to operate one or more safety systems such as safety valves, latching mechanisms, shifting sleeves, and/or the like. Since the valve relies upon forces acting on the body, the valve may operate passively or autonomously. The valve is unpowered and may continue to operate in the absence of a control signal or power, making it a relatively simple and effective safety backup. Further, the valve may be placed at or near the equipment being actuated, allowing for relatively fast response time between the actuation of the valve and the associated equipment.

Embodiments of the valve may be used in a variety of settings. The valve can be used in equipment employing hydraulic or pneumatic systems, whereby an abrupt shutdown or fail-safe is desired. In certain embodiments, the equipment is exposed to predetermined "safe" and "unsafe" stress levels, whereby the hydraulic or pneumatic system is either contributing to the elevated stress levels within the components or the hydraulics (pneumatics) could be used to trigger an alternative fail safe mechanism for safety and/or environmental reasons. For example, the valves may be used in subsea completions to provide protection for the subsea wellhead in the event of a misalignment of the marine riser. Alternatively, the valves may be used in land based wellheads. For example, the valves may be used in the event that a surface wellhead is bent or otherwise stressed. The valves may also be used in various settings such as pipelines, transmission lines, and the like. For example, the valves may be used with pipelines at various crossing points such as roads, rivers, etc. By incorporating the valves at these points, any stress applied to the pipeline may passively operate one or more safety shutoff valves prior to the pipeline being broken and leaking fluid. For example, the valves may be used in industrial crane or lifting equipment. A crane lifting a large load over a distance requires extending the crane's boom. If the boom's stress level exceeds a predetermined operating condition before the operator can intervene, the valves can be used to detect and activate an appropriate hydraulic fail-safe condition. The hydraulic circuit controlling the crane can be halted or re-directed to a safe position by integrating and using the valve within the boom.

Various configurations of the valve are possible. In a first configuration, a control signal may be transmitted through a central bore of the breakable body. Upon being broken, a fluid communication pathway with the exterior of the valve body may be opened. The fluid communication pathway may allow the control signal pressure to be reduced within the central bore by having a lower pressure in the exterior of the valve body, thereby allowing the control signal fluid to flow out of the central bore. For example, the fluid flow may relieve a "hydraulic lock" by venting the hydraulic fluid to a region of lower pressure or increased volume where an overall control signal fluid pressure is reduced. Alternatively, the fluid communication pathway may allow the control signal pressure to be increased by having a higher pressure in the exterior of the valve body, thereby allowing the higher pressure fluid to pass into the control line. Either of these configurations may allow a valve to be operated using either a pressure increase, pressure decrease, and/or relieving of a fluid lock to actuate a valve or other equipment to a desired state.

In other configurations, the exterior or interior of the valve may be in fluid communication with a shuttle piston system or other pilot operated valve system. The shuttle piston may be used to actuate one or more safety valves and/or other types of equipment to a desired state. The valve may operate in a similar manner to that described above, where the breaking of the valve body provides fluid communication between the interior and exterior of the valve. The flow of fluid through the broken valve body may be used to operate the shuttle piston and actuate the coupled components. The valve coupled with the shuttle piston, or the similar pilot operated valve system, can deliver large flow rates to the desired auxiliary equipment for increased speed of activation. This embodiment may allow multiple stress reactive valves to be distributed about a wellbore tubular or subassembly. A stress applied on any side of the wellbore tubular or subassembly may then be sensed by the breaking of the first valve rather than relying on one or more individual valve bodies to be broken.

Referring to FIG. 1, an example of a subsea well system 10 includes a sea surface platform 20. In some embodiments, the sea surface platform 20 includes a surface vessel, as shown, while in other embodiments it may include a fixed platform. The system 10 includes a marine riser string 24 that extends downwardly from the platform 20 to sea floor equipment that defines the entry point of a subsea well or wellbore 8. The wellbore 8 penetrates a subterranean formation 9 for the purpose of recovering hydrocarbons. The wellbore 8 may be drilled into the subterranean formation 9 using any suitable drilling technique. In various operating environments, all or portions of a wellbore may be vertical, deviated at any suitable angle, horizontal, and/or curved. The wellbore may be a new wellbore, an existing wellbore, a straight wellbore, an extended reach wellbore, a sidetracked wellbore, a multi-lateral wellbore, and other types of wellbores for drilling and completing one or more production zones or exploratory "wildcat" formations. Further, the wellbore may be used for both producing wells and injection wells.

In an embodiment, the lower, subsea end of the marine riser string 24 couples to a blowout preventer (BOP) 30 that, in turn, is coupled to a subsea well tree 31 (a horizontal well tree, for example). The subsea well tree 31, in turn, is coupled to a wellhead 32 of the subsea well 8. The marine riser string 24 provides protection from the surrounding sea environment for strings that are run through the string 24 from the platform 20 and into the subsea well 8. In this manner, a landing string 22 may be run through the marine riser string 24 for purposes of installing testing and/or completion equipment, such as a tubing hanger and a production tubing or a testing tool string, in the subsea well, and then communicating hydrocarbons or other well fluids along the length of the landing string 22. In some embodiments, the landing string 22 includes an assembly 59 that is located at a lower end of the landing string 22 adjacent the wellhead 32 and wellhead equipment 30, 31. In the position shown in FIG. 1, the assembly 59 is located just above the BOP 30.

Figure 2:
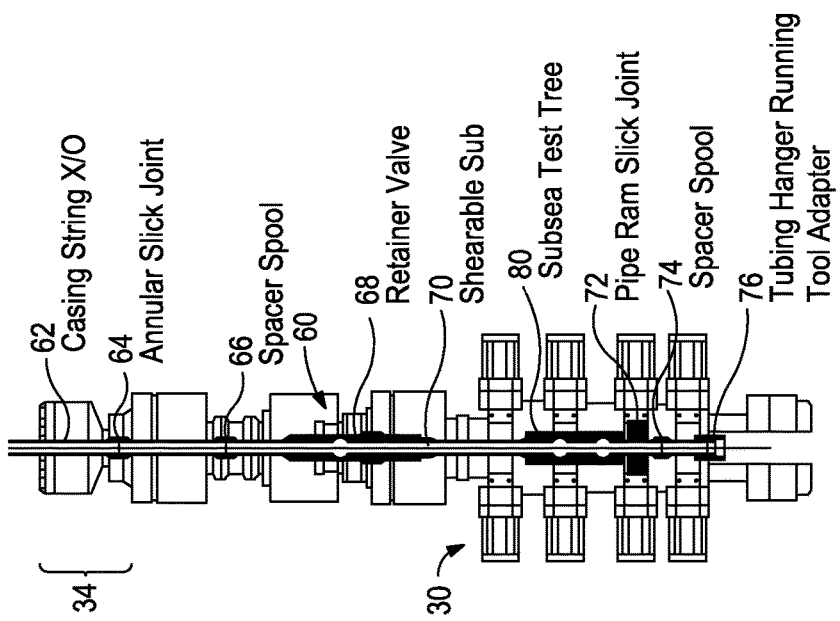
FIG. 2 illustrates an enlarged, partial cross-section view of an embodiment of a lower landing string assembly of the marine riser and landing string of FIG. 1.

Referring to FIG. 2, an enlarged and partial cross-sectional view of a lower landing string assembly 60 is shown. In various embodiments, the lower landing string assembly 60 may be part of or all of the assembly 59. The lower landing string assembly 60 is longitudinally disposed inside a portion of the BOP 30 and a flex joint 34. In some testing and completion applications an upper end of the lower landing string assembly 60, adjacent the flex joint 34, includes a casing string connection 62, followed by an annular slick joint 64, a spacer spool 66, a retainer valve 68, a shearable sub 70, a subsea test tree 80, a pipe ram slick joint, a spacer spool 74, and a tubing hanger running tool adapter 76. Various combinations of the components just listed may also be referred to as a subsea safety string. In some embodiments, the lower landing string assembly 60 includes a tubing hanger running tool (not shown) that is used to set a tubing hanger (not shown). The tubing hanger sets in the well tree 31 and grips the well tree 31 when set by the tubing hanger running tool. A production tubing (not shown) can be coupled to (threaded into, for example) the tubing hanger and extends below the tubing hanger.

Figure 3:
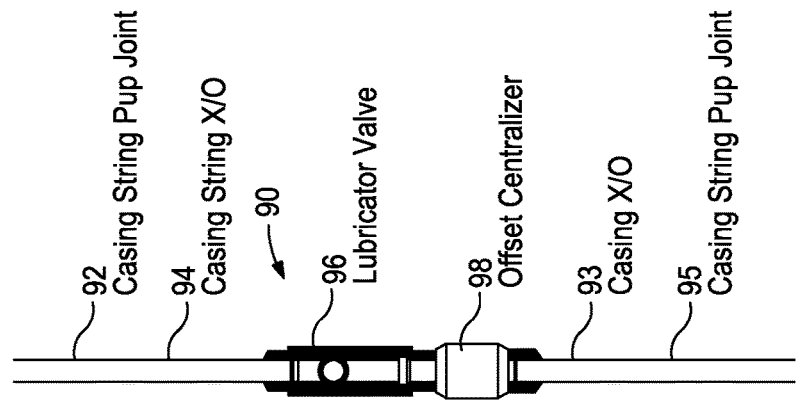
FIG. 3 illustrates an enlarged, partial cross-section view of an embodiment of an upper landing string assembly of the marine riser and landing string of FIG. 1.

Referring to FIG. 3, an enlarged, cross-section view of an upper landing string assembly 90 is shown. In some embodiments, the upper landing string assembly 90 is part of the assembly 59. The upper landing string assembly 90 includes a casing string pup joint 92, which can be coupled to the landing string 22, a casing string connection 94, a lubricator valve 96, an offset centralizer 98, a casing connection 93 and a casing string pup joint 95, which can be coupled to the casing string connection 62. It is typical that the upper landing string be located about 100 to about 300 feet below the surface of the working "drill floor" of the platform 20.

In certain embodiments, the assembly 59 includes other equipment and tools that are related to the monitoring and management of the deployment of the landing string 22 and associated completion equipment. For example, in some embodiments, the assembly 59 includes valves and a latch to control the connection and disconnection of the marine riser string 24 and the landing string 22 to/from the BOP 30. Such tools provide potential emergency disconnection of the landing string 22 from the BOP 30, as well as prevent well fluid from flowing from the well or the landing string 22 during the disconnection and connection of the landing string 22 to/from the BOP 30. As will be described more fully below, safety devices can be used to disconnect the landing string 22 and the marine riser string 24 from the BOP 30 during emergency situations so that the sea surface platform 20 can safely move away from the wellhead.

Figure 4:
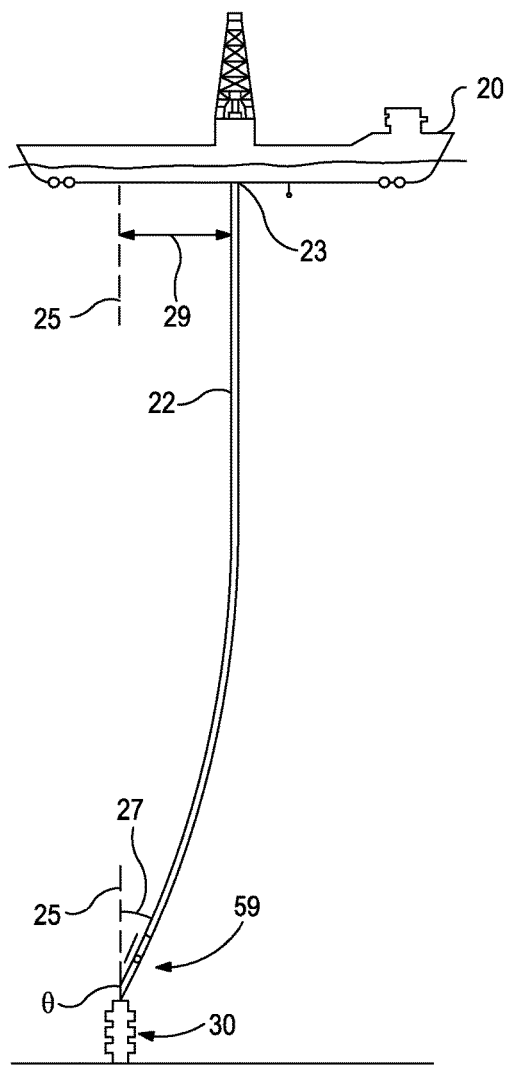
FIG. 4 illustrates a schematic view of an embodiment of the operating environment of FIG. 1 wherein the surface vessel is off-center relative to the wellhead and the landing string is coupled at an angle to the wellhead equipment.

Referring to FIG. 4, a force applied to the platform 20 causes the platform 20 and a connection 23 to move a distance 29 away from a centralized position of the connection 23 over a longitudinal axis 25 of the BOP 30. For clarity, the marine riser string 24 is not depicted in FIG. 4. The distance 29 creates a deviation 27 from the axis 25, including a bend or inclination angle $\ominus$. In certain embodiments, an excessive bend angle $\ominus$ creates a situation where disconnection at the landing string 22 is only possible before a pre-determined maximum deviation. In some embodiments, the maximum bend angle for safe disconnection $\ominus$ is about five to about nine degrees.

Figure 5:
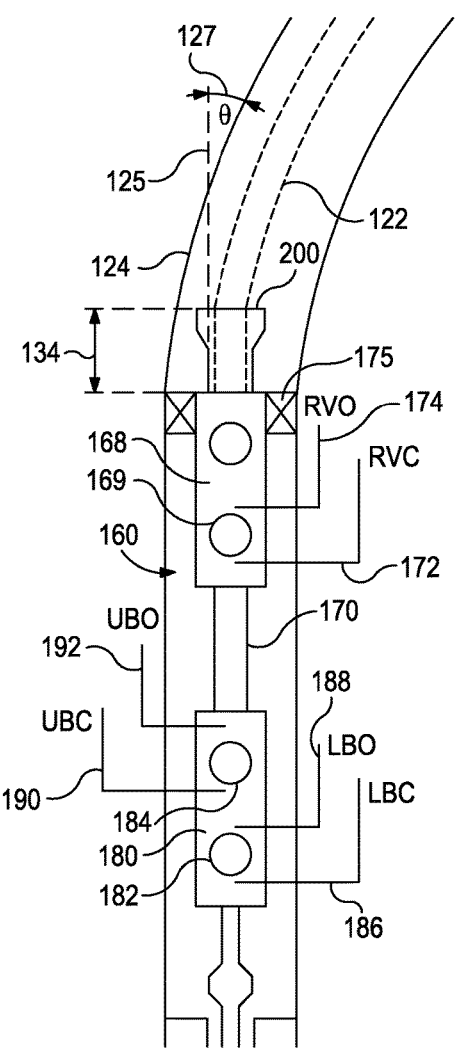
FIG. 5 illustrates an enlarged, schematic view of another embodiment of a landing string assembly including a safety tree and a stress reactive valve in accordance with the principles disclosed herein.

Referring next to FIG. 5, another embodiment of a landing string assembly is depicted as a landing string assembly 160, in cross section. The landing string assembly 160 shares similar features to the landing string assemblies 60, 90 in FIGS. 2 and 3, with some notable differences. For simplicity, the surrounding wellhead equipment, such as the BOP 30, is shown schematically or is not shown. At a lower end of the landing string assembly 160, a subsea test tree 180 includes a lower ball valve 182 and an upper ball valve 184. The lower ball valve 182 includes a lower ball close (LBC) line 186 and a lower ball open (LBO) line 188. The upper ball valve 184 includes an upper ball close (UBC) line 190 and an upper ball open (UBO) line 192. The subsea test tree 180 is coupled to a shearable sub 170 which is coupled to a retainer valve 168 having a ball valve 169 with a retainer valve close (RVC) line 172 and a retainer valve open (RVO) line 174. Surrounding an upper portion of the retainer valve 168 is a centralizer 175. Various combinations of the components just described may also be referred to as a subsea safety string. Coupled above the retainer valve 168 is a valve housing 200. In some embodiments, the valve housing 200 is a sub or crossover. In some embodiments, the valve housing 200 is a body incorporated into a flex tubular that is disposed across marine riser flex joint 134. In other embodiments, the valve housing 200 is disposed in other portions of the landing or safety string, or is designed integral with apparatus or parts of the subsea wellhead landing string component systems 60, 90, 160.

Figure 6:
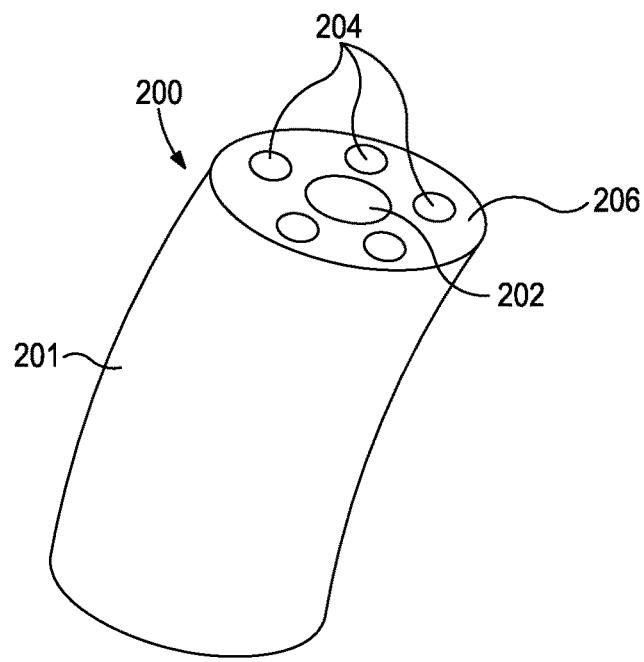
FIG. 6 illustrates an enlarged, perspective view of an embodiment of a body or sub for housing the stress reactive valve, in exaggerated response to a bending stress.

One or more of the referenced lines (e.g., lines 186, 188, 190, 192, 172, 174) may pass through one or more bores disposed in the valve housing 200. Referring briefly to FIG. 6, a perspective view of the valve housing 200 shows a top surface 206, a central flow bore 202, and a plurality of bores, passageways, or cavities 204. The plurality of bores 204 may be distributed about the central flow bore 202 in any suitable manner. The distribution about the central flow bore 202 may be used to allow the valve bodies to be exposed to a stress from each of the directions about the valve housing 200.

Referring back to FIG. 5, a lateral force applied to a marine riser string 124 and a landing string assembly 122 due to movement of the surface platform 20 as described herein will create a deviation 127 from an axis 125 at an inclination or bend angle $\ominus$. As shown in FIG. 6, the bend angle $\ominus$ creates a bending stress in a body 201 of the valve housing 200 as shown by the exaggerated deformation of the housing body 201. In some embodiments, as shown if FIG. 7, a stress reactive valve 300 (or any of the other valve embodiments disclosed herein) is disposed in one or more of the bores 204. The valves 300 can be exposed to a stress from each of the directions about the body 201 of the valve housing 200. In this manner, at least one valve body 320 receives a bending stress in any direction of bending as shown in FIG. 6 and in FIG. 7.

Figure 7:
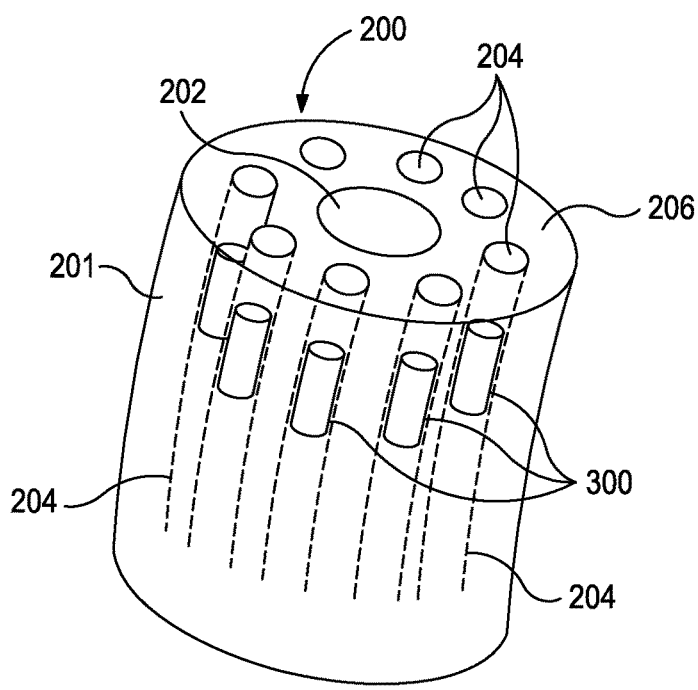
FIG. 7 illustrates an enlarged, perspective view of a slightly modified embodiment of the body or sub of FIG. 6.
Figure 8:
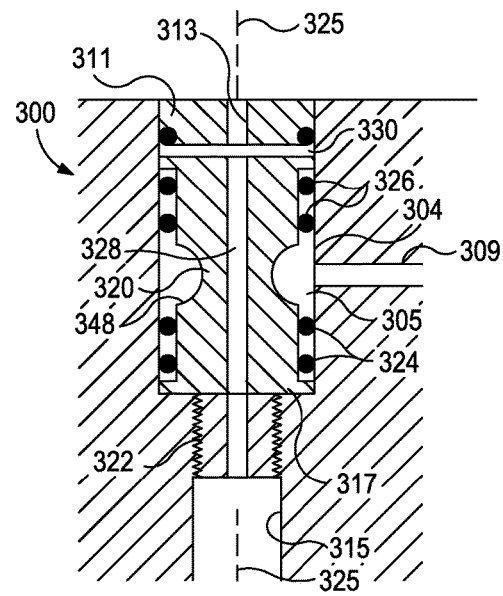
FIG. 8 illustrates a schematic, cross-section view of an embodiment of a stress reactive valve.

Referring next to FIG. 8, an embodiment of a stress reactive valve is shown in cross-section. A stress reactive valve assembly 300 includes a valve body 320 captured in a bore or passageway 304 of a valve housing such as those previously described (e.g., one or more of bores 204 in FIGS. 6 and 7). The valve body 320 is captured between a removeable cap or plate 311 and a shoulder 317, forming a chamber 305 for containing the valve body 320. The valve body 320 includes a central axis 325 along which a central flow bore 328 extends. In one embodiment, for independent hydraulic line control, or hydraulic pass-through, the central flow bore 328 is in fluid communication with a central flow bore 313 of the cap 311 and a flow passage 315 in the valve housing. A threaded connection 322 couples the end of the valve body 320 into the flow passage 315. A first set of seals 324 and a second set of seals 326 seal the valve body against the bore 304 while allowing axial movement of the valve body 320 along the axis 325 in the chamber 305. A gap 330 between the valve body 320 and the cap 311 allows the valve body 320 to float freely in an axial direction in the chamber 305 (e.g., to allow for thermal expansion and/or axial strain of the body 201 of FIGS. 6 and 7). A fluid passage 309 in the valve housing is fluidly coupled with the chamber 305, and is in fluid communication with a pressurized fluid source, or source pressure. In some embodiments, the source pressure is the marine riser hydrostatic annulus pressure. In other embodiments, the source pressure can come from a downhole gas-charged accumulator integral with the lower landing string 60 or within the assembly 59. In certain embodiments, the accumulator is charged with a gas such as nitrogen. In yet another embodiment, the chamber 305 can be communicated to an atmospheric low pressure source, such as an air chamber volume integral with the lower landing string 60 or within the assembly 59.

The valve body 320 includes a reduced outer diameter portion or reduced thickness portion 348. The portion 348 may be configured to create a stress concentration point in the valve body 320 to allow the valve body 320 to break in response to a stress at a predetermined point and/or over a desired portion. In some embodiments, the portion 348 is C-shaped or semi-circular. In other embodiments, the portion 348 is triangular, rectangular, or other suitable shapes.

In some embodiments, the valve body 320 can be used for piloting a separate valve such as a piston shuttle valve. In these embodiments, the central flow bore 313 of the cap 311 is eliminated. Further, there is no hydraulic fluid present inside the central flow bore 328 when the valve body 320 is in an unbroken or "closed" position or state. Still further, hydraulic fluid is present in the chamber 305 via the fluid passage 309 in the unbroken or "closed" state. When the valve is broken to a broken or "open" state (as will be more fully described below), fluid communication is established with the source pressure via the passage 309, coupling the chamber 305, the flow bore 328, and the flow passage 315 to the source pressure.

Figure 9:
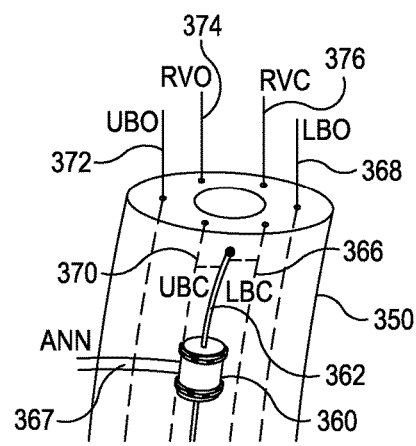
FIG. 9 illustrates a schematic, perspective view of an alternative embodiment of the stress reactive valve housed in a sub.

Referring now to FIG. 9, a valve housing 350 is shown in perspective with certain portions shown in phantom. The valve housing 350 contains one or a series of stress reactive valve assemblies 360 similar to the stress reactive valve assemblies of FIG. 8. On one side of the valve assembly 360 is a pressure port passage 367, acting as the entry port or communication pathway by which a pressure source is communicated to the chamber 305 as shown in FIG. 8. On another side of the valve assembly 360 is an outlet fluid passage 362 coupled to one or more of a series of fluid connections coupled to actuatable components in the landing string or safety string. The outlet fluid passage 362 may also be coupled to a pilot operated valve system, such as a piston shuttle valve, by which activation of the pilot operated valve system will in turn activate one or more actuatable components in the landing string or safety string. For example, a fluid connection 366 is coupled to the LBC line 186 of the subsea test tree 180, a fluid connection 368 is coupled to the LBO line 188 of the subsea test tree 180, a fluid connection 370 is coupled to the UBC line 190 of the subsea test tree 180, a fluid connection 372 is coupled to the UBO line 192 of the subsea test tree 180, a fluid connection 374 is coupled to the RVO line 174 of the retainer valve 168, and a fluid connection 376 is coupled to the RVC line 172 of the retainer valve 168.

In some embodiments, the valve assemblies 300, 360 include pass-through hydraulic lines to allow normal operation hydraulic fluid communication through the valve body 320. Upon the valve body 320 being broken in response to a stress, the pass-through hydraulic lines will be exposed to a source pressure via the pressure port fluid passages 309, 367. The pressure in the pressure port fluid passages 309, 367 may be configured to transition one or more components (for example, one or more safety valves) to a safe state. Traditionally, subsea safety valves are designed to fail-safe to a "close" position. The subsea safety valve is held in an "open" position by applying pressure to the "open" hydraulic line and leaving the "close" line vented. By design, the subsea safety valve is biased to close on its own accord, typically by a spring or gas pressure bias. In an emergency, the subsea safety valve will close by venting the "open" hydraulic line to the valve, whereby the valve bias mechanism will close the safety valve. In certain embodiments of the stress reactive valve disclosed herein, the break in the valve body 320 (or other valve bodies disclosed elsewhere herein) may provide a fluid communication between any valve "open" lines and a pressure port fluid passage having a reduced pressure (for example, atmospheric pressure) such that exposure to the reduced pressure operates to close a valve. For example, the pressure port fluid passage 367 can be communicated to an atmospheric pressure chamber volume integral to the lower landing string 60 or within the assembly 59. In a similar manner, such as in a land based environment, the pressure port fluid passages may be at approximately atmospheric pressure. The fluid communication may then cause the control line pressure to be reduced to atmospheric and a coupled safety valve to close. In other embodiments, the break may provide a fluid communication between any valve close lines and an increased source pressure (for example, hydrostatic sea pressure in a subsea wellhead or an accumulated high pressure) such that exposure to the increased pressure operates to close a valve.

Figure 10:
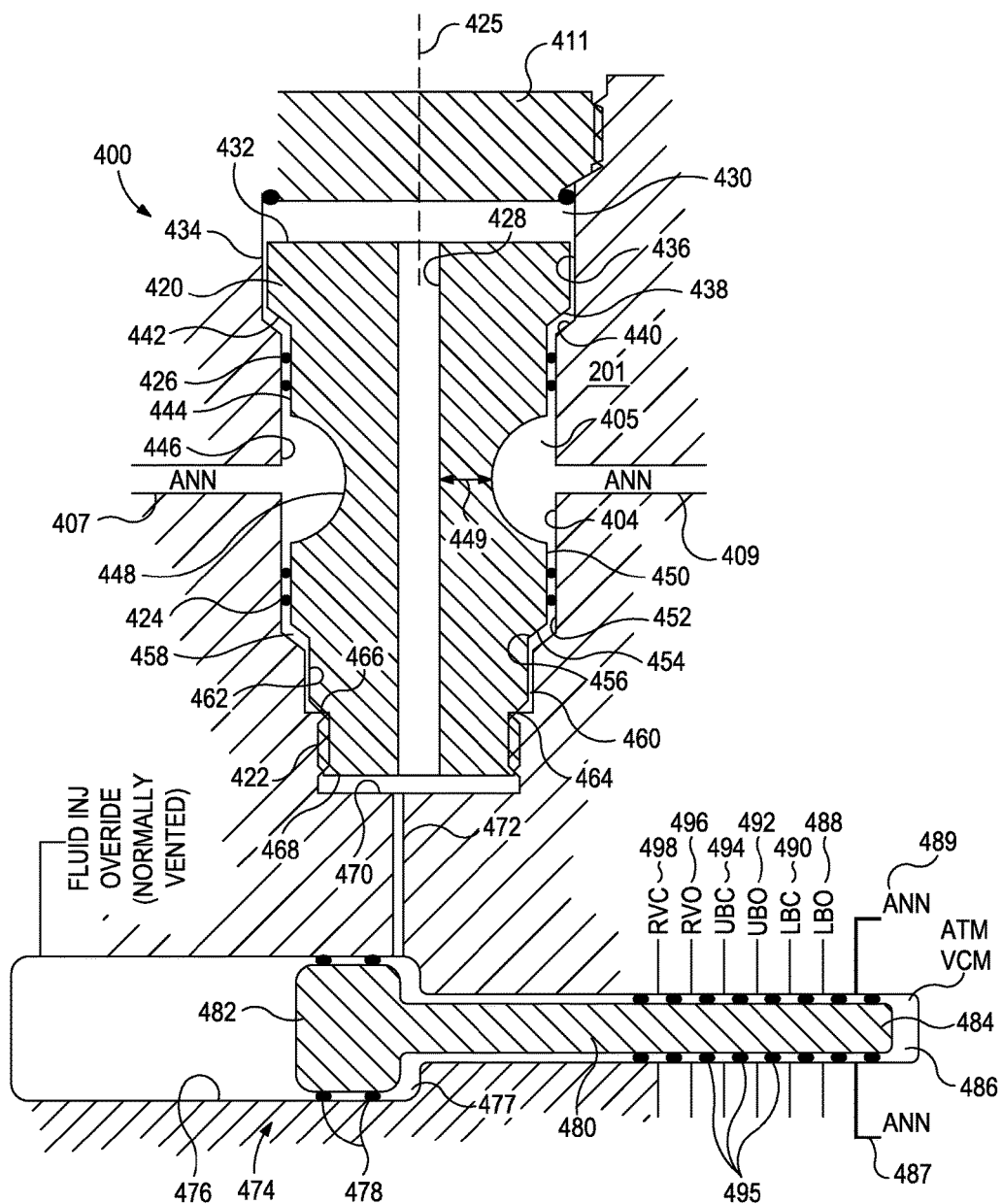
FIG. 10 illustrates a schematic, cross-section view of another alternative embodiment of a stress reactive valve and pilot piston assembly.

Referring now to FIG. 10, another embodiment of a stress reactive valve is shown in cross-section. A stress reactive valve assembly 400 includes a valve body 420 disposed in a bore 404 provided in the valve housing body 201. The valve body 420 is captured in the bore 404 by a removeable cap or plate 411 forming a chamber 405 for containing the valve body 420. The valve body 420 includes a central axis 425 along which a central flow bore 428 extends. Near the end 470 of the chamber 405, a threaded connection 422 couples and anchors the end 468 of the valve body 420 to the valve housing body 201. The other end 432 of the valve body 420 is free to move axially along the axis 425; thus, the valve body 420 is not particularly sensitive to axial loads.

The chamber 405 includes a surface 436, a tapered surface 440, a reduced diameter surface 446, flow passages 407, 409, a reduced diameter surface 452, a tapered surface 456, a further reduced diameter surface 462, a shoulder 466 and the threaded connection 422. The valve body 420 includes a full diameter surface 434, a tapered surface 438, a reduced diameter surface 444, a C-shaped or otherwise reduced diameter surface 448 (as previously described, other shapes are contemplated) with a reduced thickness 449, a reduced diameter surface 450, a tapered surface 454, a further reduced diameter surface 460, a mating shoulder 464 and the threaded connection 422. The interface at the surfaces 434, 436 and the interface at the surfaces 460, 462 include close or tight tolerances, while the intermediate opposing surfaces include a gap 442 and a gap 458. Thus, the valve body 420 is reactive, sensitive, or responsive to bending stresses in the valve housing body 201. These interfaces react against each other, or oppose each other, in response to lateral, radial, or bending stresses. Meanwhile, the valve body 420 is able to move axially at these interfaces with the aid of upper o-rings 426 and lower o-rings 424 which can slide along their respective surfaces. The threads 422 anchor the lower end 468 of the valve body 420.

The valve assembly 400 also includes a shuttle or pilot piston assembly 474. The pilot piston assembly 474 includes a piston 480 having a piston head 482 slidably disposed in a cylinder portion 476 and a rod 484 slidably disposed in a cylinder portion 486. The piston head 482 includes seals 478 that separate a chamber 477 from the remainder of the cylinder portion 476, wherein the chamber 477 fluidly communicates with a fluid passage 472 that in turn fluidly communicates with the central flow bore 428 of the valve body 420. A plurality of seals 495 along the piston rod 484 isolate various lines including annulus lines 487, 489, a LBO line 488, a LBC line 490, a UBO line 492, a UBC line 494, a RVO line 496, a RVC line 498, and finally a chamber 486.

The valve bodies 320, 420 comprise a breakable, destructible, or frangible material. In some embodiments, the valve bodies 320, 420 comprise a plastic. In some embodiments, the valve bodies 320, 420 comprise a composite glass. In some embodiments, the valve bodies 320, 420 comprise a brittle material. In other embodiments, the valve bodies comprise other breakable, destructible, or frangible materials.

Figure 11:
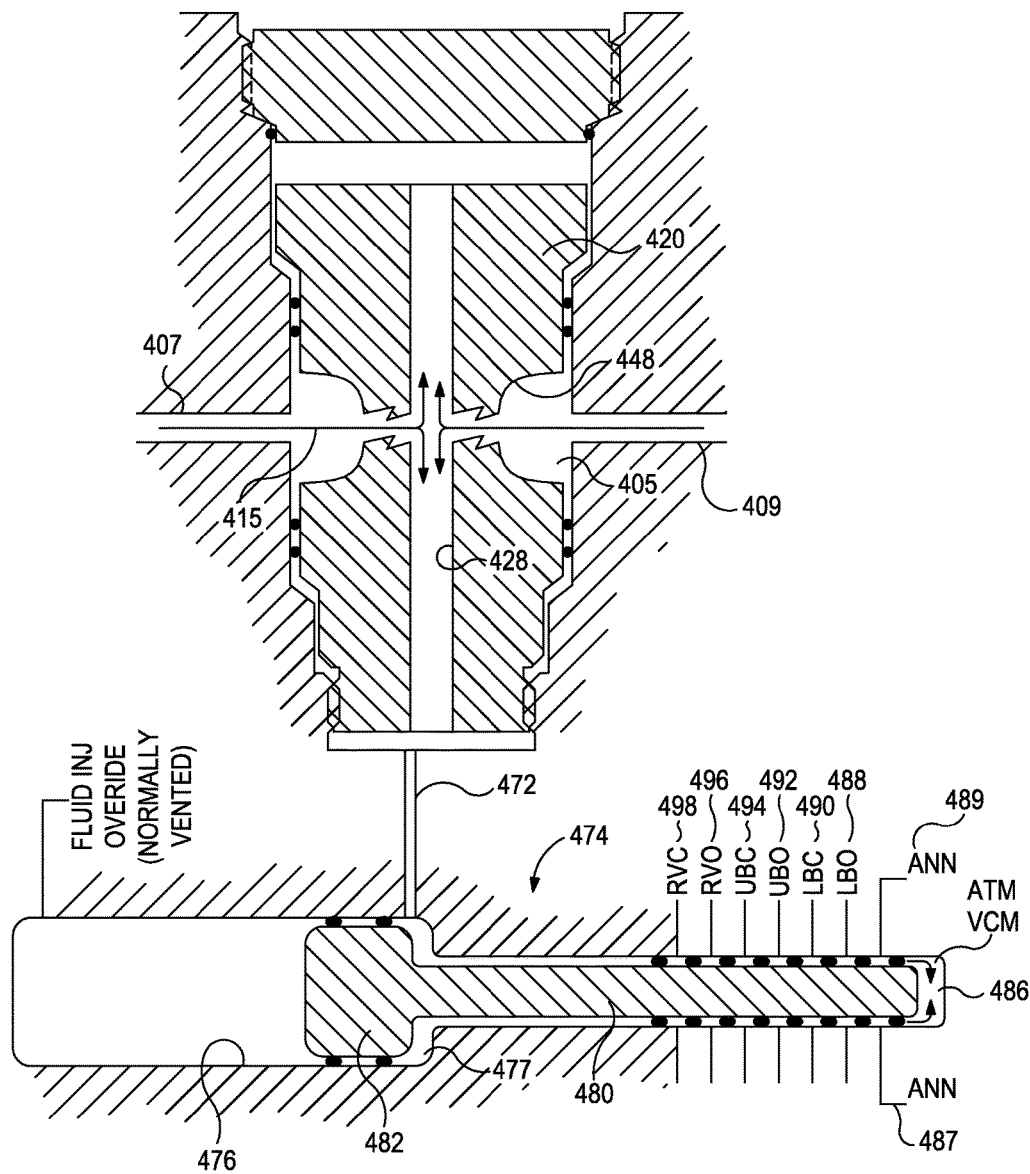
FIG. 11 illustrates an embodiment of the stress reactive valve and pilot piston assembly of FIG. 10 in a broken condition or open position in response to a stress.

In operation, when a subsea well system 10 such as that described with respect to FIGS. 1-5 undergoes a bending stress in the landing string 22, 122 that exceeds a predetermined bending stress limit, the stress reactive valve assemblies 300, 400 are passively actuated to hydraulically close the valves in the subsea test tree 80, 180 and/or the retainer valve 68, 168, which may allow the unlatch mechanism to operate and disconnect the landing string 22 from the BOP 30. In some embodiments, the predetermined bending stress limit is calculated from the maximum allowable bend angle $\Theta$ of the landing string 22, 122. In some embodiments, the maximum allowable bend angle $\Theta$ is between five and nine degrees. Before the predetermined bending stress limit is reached, the valve bodies 320, 420 isolate the high pressure annulus lines 309, 367, 407, 409 from the hydraulic lines of the valves in the subsea test tree 80, 180 and the retainer valve 68, 168. Because of the radial or circumferential contact points at the upper and lower portions of the valve bodies 320, 420, the stress concentration areas at the surfaces 348, 448, and the allowable axial movement of the valve bodies 320, 420 as herein described, the frangible material of the valve bodies 320, 420 reacts to an excessive bending stress by breaking in the stress concentration areas 348, 448. Referring to FIG. 11, the valve body is broken at the surface 448 and through the valve body 420 to establish a flow path between the high pressure annulus lines 407, 409 and the central flow bore of the valve body 420. Thus, in a non-broken or closed position of the valves 300, 400, the high pressure annulus lines 407, 409 are isolated from the central flow bore 428 and the hydraulic lines of the valves in the landing string. After the valve body 420 is broken or passively actuated to its open position, these lines are exposed to each other and fluid communication is established.

The high pressure fluid from the annulus lines 407, 409 (and the lines 309, 367 in FIGS. 8 and 9, though for simplicity the valve assemblies in FIGS. 10 and 11 will be specifically referred to below) is directed to each of the "close" lines, as described herein, of the subsea safety string including the retainer valve 168 and the subsea test tree 180 to close the corresponding valves 182, 184, 169. In some embodiments, an atmospheric chamber is in fluid communication with the "open" lines, as described herein, at the same time as exposure to the annulus pressure. The resulting pressure differential will cause the valves 182, 184, 169 and the subsea safety tree to close safely.

In some embodiments, the annulus pressure, or other high pressure, is communicated to both the "open" and "close" lines of the valves in the subsea safety tree. Referring to FIG. 11, after the excessive bending stress has broken the valve body 420 and a fluid path 415 is established between the annulus lines 407, 409 and the flow bore 428 and the flow line 472, the chamber 477 and the piston 480 are exposed to the annulus pressure. Consequently, the piston 480 is forced toward the other end of the cylinder portion 476, sequentially exposing the valve "open" and "close" lines 488, 490, 492, 494, 496, 498 to the annulus pressure ported into the chamber 486 through annulus fluid lines 487, 489. Because both the "open" and "close" lines of the subsea valves coupled thereto are exposed to annulus pressure, the pressure is equalized across the subsea valves. In some embodiments, the valves include a biasing member or mechanism configured to bias the valves to their closed positions when exposed to the equalized pressure. Thus, in some embodiments, the valves 182, 184, 169 and other valves in the subsea safety tree are biased to the "close" position when exposed to an equalized pressure across each valve provided by a broken valve body 420 and an initiated pilot piston assembly 474. In some embodiments, the biasing member is a spring or other valve compatible force member. In other embodiments, a gas charge (for example, nitrogen) is used to bias the valve to the "close" position.

In various embodiments herein, the valve bodies 320, 420 are relatively insensitive to axial loads along axes 325, 425, such as tension or compression along the axes 325, 425. Because the valve bodies are free to move axially, or float, in the bores 304, 404 and the chambers 305, 405, but are also constrained laterally or radially relative to the axes 325, 425 as described, the valve bodies will react to forces in the lateral or radial direction such as bending stresses in the riser 124 and/or landing string 122. The reaction comprises a break at the stress concentration areas 348, 448 such that the previously isolated fluid inlet/outlet or paths are now in fluid communication to close one or a multitude of valves within the subsea safety string or landing string 22.

Figure 12:
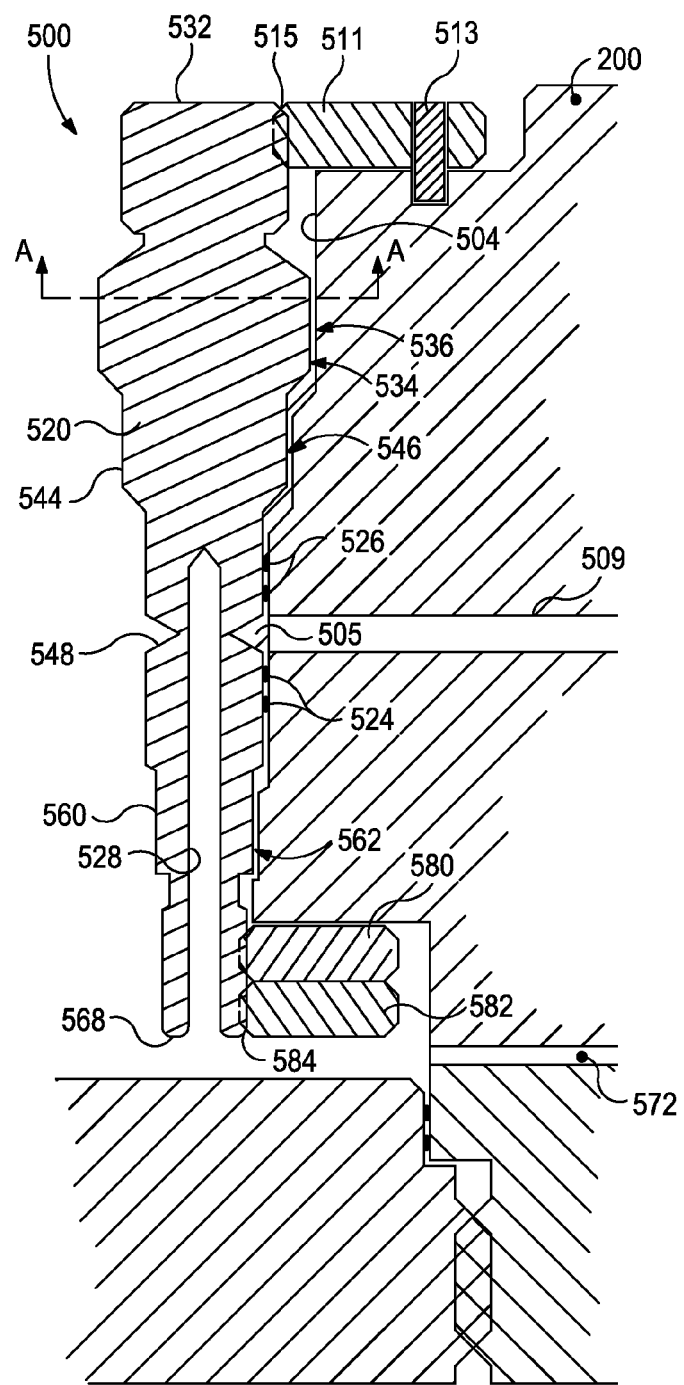
FIG. 12 illustrates a schematic, cross-section view of still another alternative embodiment of a stress reactive valve sensitive to multiple stresses.

In further embodiments, a stress reactive valve is sensitive to additional stresses. Referring to FIG. 12, a stress reactive valve 500 includes a valve body 520 that is reactive to a bending stress, a tensile stress, a torsional stress, a shear stress, an impulse load or a combination thereof. In the discussion that follows, some features of the stress reactive valves shown are similar to corresponding features of the stress reactive valves already described. In the interest of clarity and ease of description, similar features may not be described in detail while the primary focus may be on new or different features. Further, general reference will be made to a housing 200 for the surrounding support for the stress reactive valves described below even though each specific housing design may include slight variations.

Figure 13:
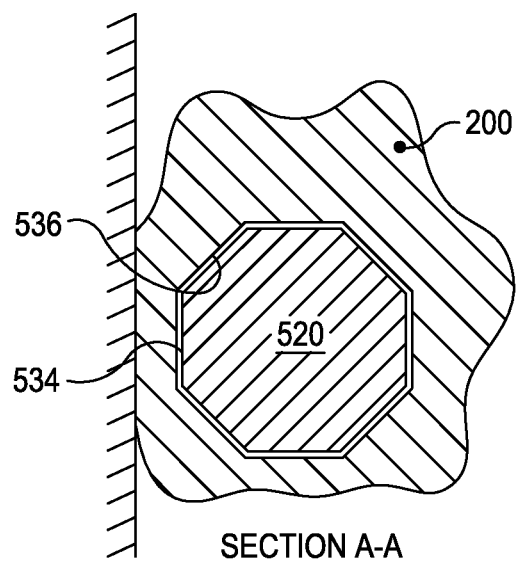
FIG. 13 illustrates an enlarged view of the section A-A of the embodiment of FIG. 12.

The valve body 520 is secured in a bore 504 in the housing 200. An upper end 532 of the valve body 520 is secured by a fastener nut 511 and a pin 513 at a connection interface 515. A pair of opposing surfaces 534, 536 includes torsion resistive geometry. Referring to the section A-A view of FIG. 13, the valve body surface 534 includes an outer octagon shape while the housing surface 536 includes a corresponding octagon shape. The opposing, octagon shaped surfaces 534, 536 resist rotational or torsional movement of the valve body 520 relative to the housing 200, thereby making the valve body 520 sensitive to torsion. In other embodiments, the surfaces 534, 536 include other torsion resistive shapes. For example, the surfaces 534, 536 may include keyed flats or splines that resist relative rotation. Below the torsion resistive surfaces 534, 536 are close-fit tolerance surfaces 544, 546 similar to the close-fit tolerance surfaces 434, 436 of FIG. 10 and close-fit tolerance surfaces 560, 562 similar to the close-fit tolerance surfaces 460, 462 of FIG. 10. As with the valve 400, the valve 500 is sensitive to a bending stress by controlling close-fit tolerances in two, separate axial locations along the valve body 520 at 544, 546 and at 560, 562. Similar to the valve 400, the valve 500 includes a pair of o-rings 526 and a pair of o-rings 524 surrounding a chamber 505 and a stress concentration area 548. In some embodiments, the stress concentration area 548 includes a V-shaped surface. A fluid passage 509 in the housing 200 couples to a source pressure, and a fluid passage 572 in the housing 200 couples to a subsea valve or a pilot operated valve system as described herein. Finally, a lower end 568 of the valve body 520 includes a central flow passage 528 and is secured to the housing 200 by pinned fasteners or multiple fasteners 580, 582 at a connection interface 584. The valve 500 is sensitive to tensile loads by securing both ends 532, 568 of the valve body 520 to resist axial displacement. Consequently, the stress reactive valve 500 can be sensitive to a combination of torsion, bending stress, and tensile stress. Other combinations of stresses can be addressed by adding or removing the desired features corresponding to the stress type.

Figure 14:
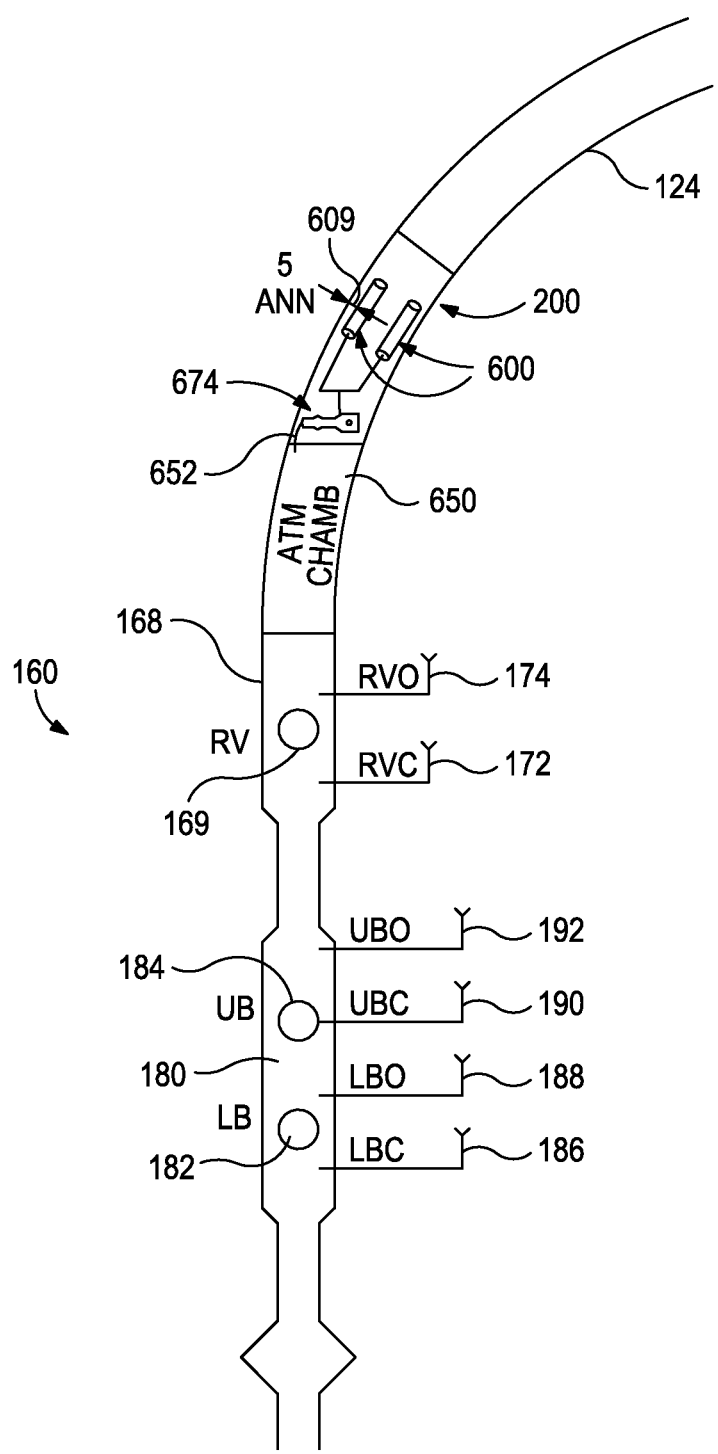
FIG. 14 illustrates an enlarged, schematic view of another alternative embodiment of a landing string assembly including a stress reactive valve housing coupled to an atmospheric chamber.
Figure 15:
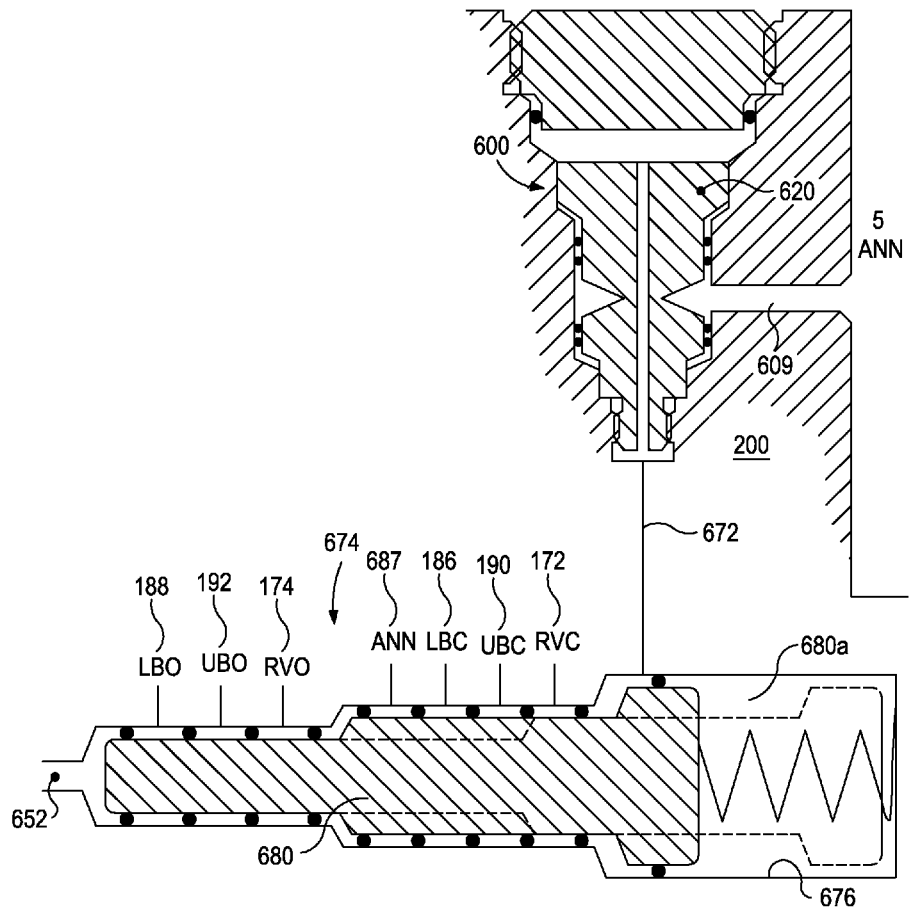
FIG. 15 illustrates an enlarged, cross-section view of an embodiment of a stress reactive valve and pilot piston assembly of FIG. 14.
Figure 16:
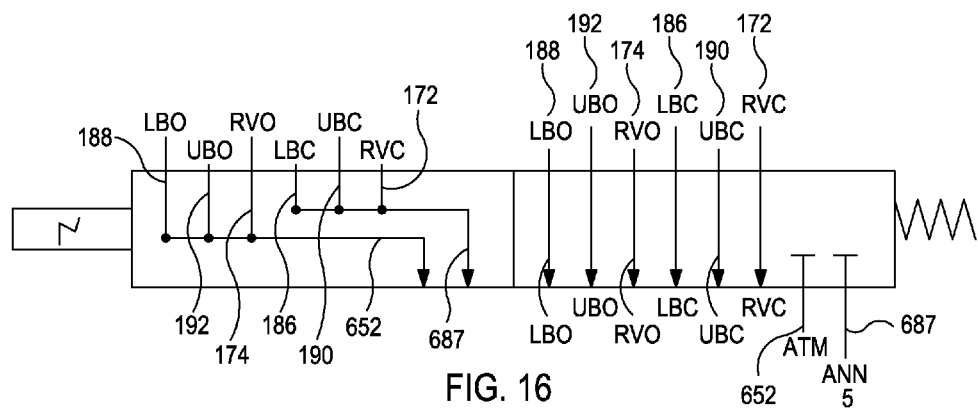
FIG. 16 illustrates a schematic view of an embodiment of the hydraulic lines coupling the components of FIGS. 14 and 15.

Referring next to FIG. 14, another embodiment of a landing string assembly is shown and is similar to the assembly shown in FIG. 5. The landing string assembly 160 includes the subsea test tree 180, the retainer valve 168, and all of the ball valves and fluid lines as shown and described with respect to FIG. 5. The valve housing 200 is coupled to the landing string 122 and includes stress reactive valves 600. The stress reactive valves 600 include ports 609 to the annulus fluid 5 and are coupled to a pilot piston assembly 674. The pilot piston assembly 674 includes a fluid connection 652 to an atmospheric chamber 650. Referring to FIGS. 15 and 16, the valve 600 includes a valve body 620 consistent with the valves bodies discussed herein. In certain embodiments, the valve housing 200 includes multiple valve bodies 620, as shown in FIG. 7. In operation, when any one or more of the valve bodies 620 is broken in response to a stress, communication is established between the annulus pressure 5 and the pilot piston assembly 674, whereby annulus pressure 5 is communicated through fluid passage 687 to shift the pilot piston 680. The annulus pressure 5 causes a pilot piston 680 to shift from the solid line position of FIG. 15 to a broken line position 680a. Once the pilot piston 680 is in the position 680a, the "open" lines 174, 188, 192 are exposed to the atmospheric chamber connection 652 and the "close" lines 172, 186, 190 are exposed to an annulus pressure fluid passage 687. A valve fluid passage 672 also communicates with a main piston cylinder 676. Consequently, the three subsea valves 169, 182, 184 are actuated closed.

Figure 17:
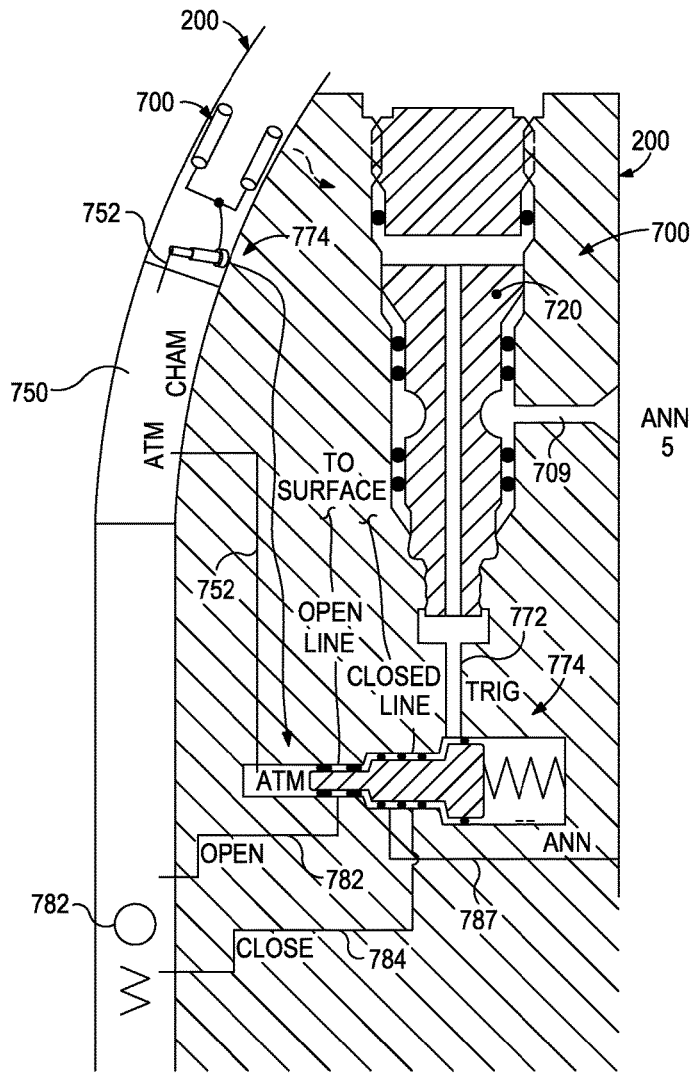
FIG. 17 illustrates a schematic and cross-section view of still another alternative embodiment of a landing string assembly, a stress reactive valve housing coupled to an atmospheric chamber, a stress reactive valve, and pilot piston assembly.
Figure 18:
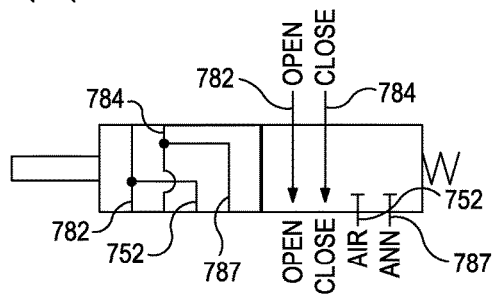
FIG. 18 illustrates a schematic view of an embodiment of the hydraulic lines coupling the components of FIG. 17.
Figure 19:
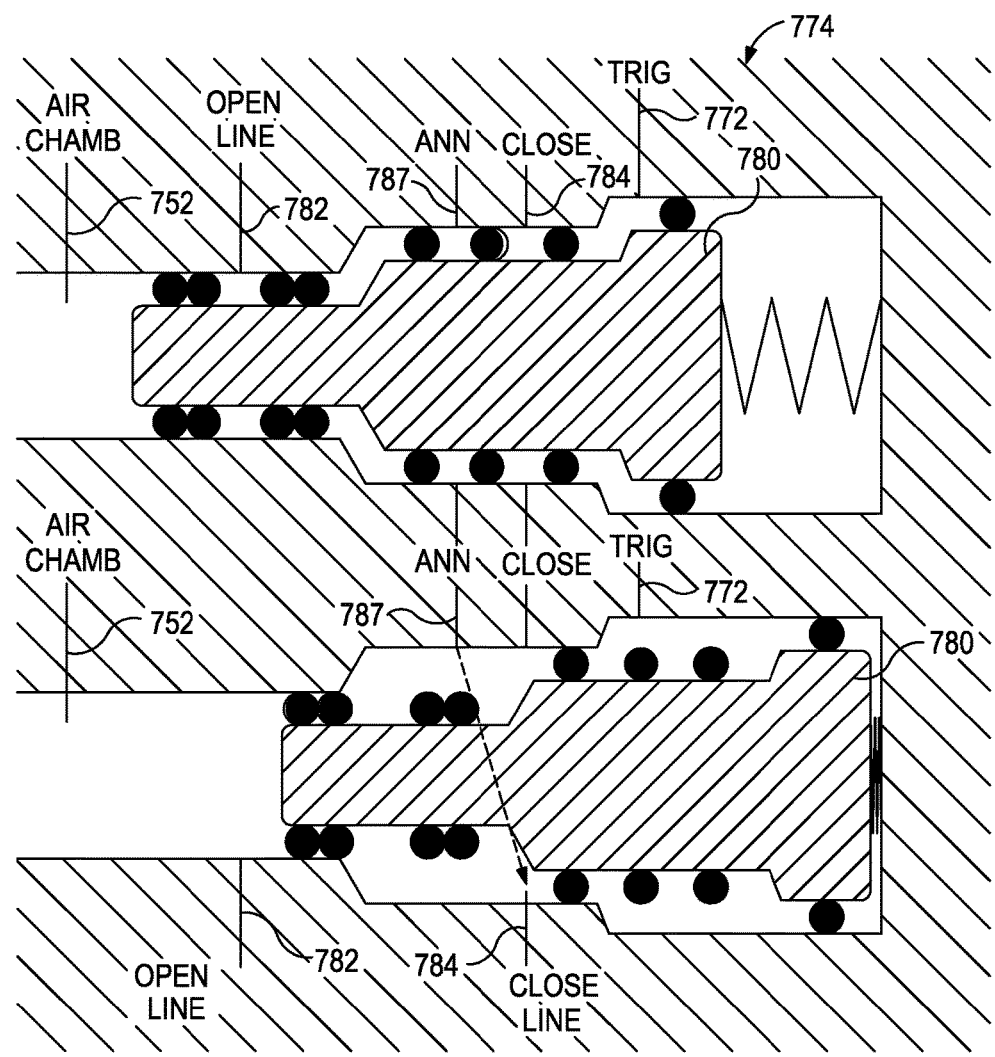
FIG. 19 illustrates an enlarged view of an embodiment of the pilot piston assembly of FIG. 17 in multiple positions.

In other embodiments, a stress reactive valve can be used to actuate one subsea valve. Referring to FIG. 17, the valve housing 200 includes one or more stress reactive valves 700 which are coupled to a pilot piston assembly 774. The pilot piston assembly 774 is coupled to an atmospheric chamber 750 via fluid passage 752. In operation, and with reference to FIGS. 17-19, a valve body 720 is broken in response to a stress to establish fluid communication between the annulus fluid pressure 5 in the fluid port 709 and a fluid passage 772 coupled to the pilot piston assembly 774. As shown in FIGS. 18 and 19, the annulus fluid pressure will cause a pilot piston 780 to shift and expose a "close" line 784 to the annulus fluid pressure 5 while exposing an "open" line 782 to the atmospheric chamber 750, in turn actuating a subsea valve 782 to a closed position. In other embodiments, the "open" line 782 and the "close" line 784 can both be exposed to the annulus pressure 5 without using an atmospheric chamber 750 to equalize the pressure across the valve 782 upon breaking the valve body 720. In such an embodiment, the valve 782 includes a fail-safe "close" ball valve. The "open" line 782 pressure is vented with the same pressure on the "close" line 784, thus enabling a fail-safe spring or other biasing member to close the valve 782.

Figure 20:
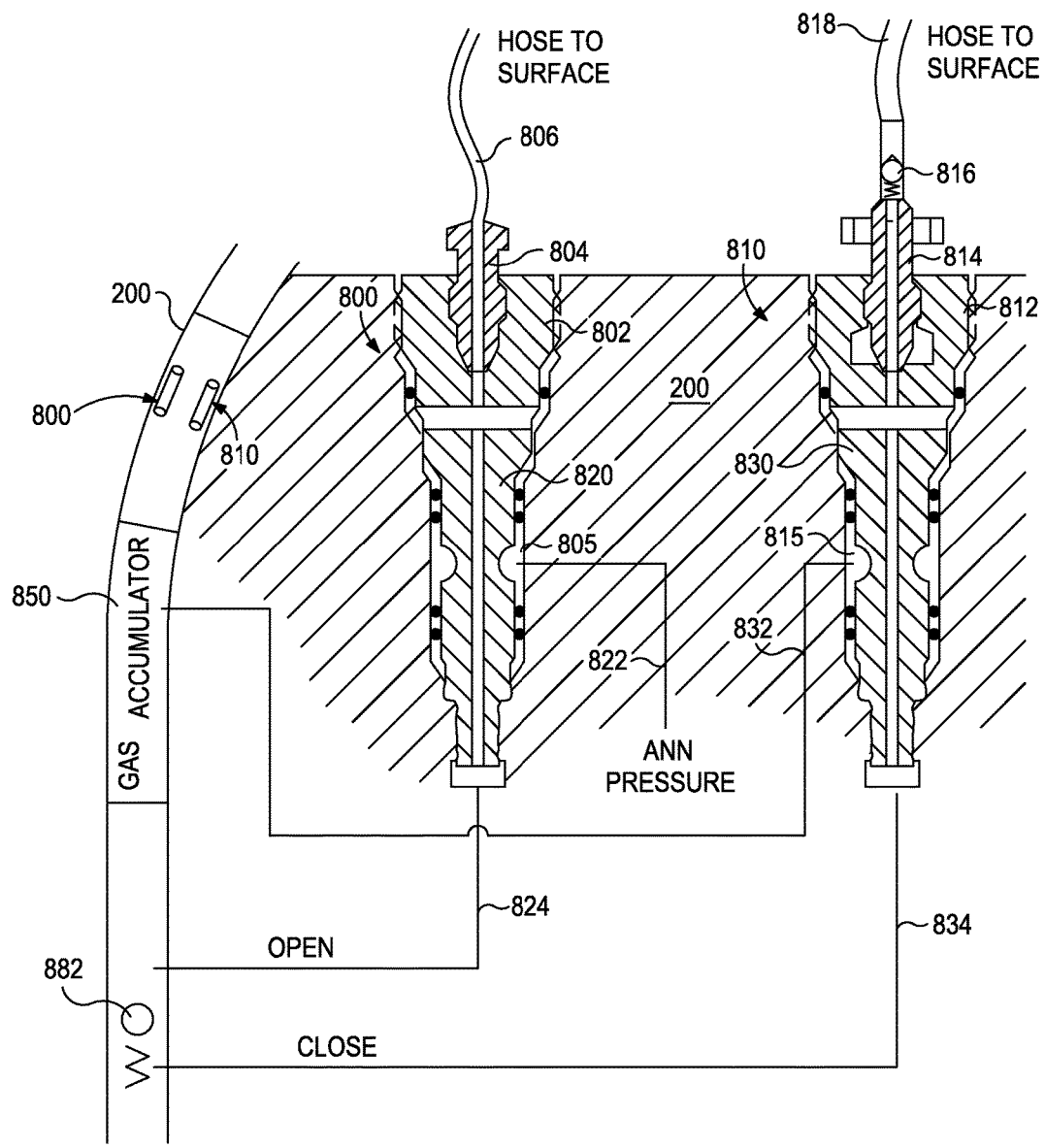
FIG. 20 illustrates a schematic and cross-section view of yet another alternative embodiment of a landing string assembly, a stress reactive valve housing coupled to a gas accumulator, and stress reactive valves.

Referring now to FIG. 20, stress reactive valves may be used in a pass-through application. The valve housing 200 includes stress reactive valves 800, 810. Below the valve housing 200 is a gas accumulator 850 and a subsea valve 882. A first stress reactive valve 800 includes a valve body 820 and a chamber 805 coupled to an annulus fluid line 822. The valve 800 also includes a cap 802 that receives a pressure fitting 804 that is coupled to a hose 806 that extends to the surface. A second stress reactive valve 810 includes a valve body 830 and a chamber 815 coupled to a fluid line 832 that couples to the gas accumulator 850. The valve 810 also includes a cap 812 that receives a pressure fitting 814. In some embodiments, the pressure fitting 814 includes an isolation valve 816. In other embodiments, an isolation valve is integrated into the housing 200. The isolation valve 816 may comprise any number of valves configured to prevent source pressure from being transmitted up the hose 818 after the stress reactive valve 810 is activated. For example, the isolation valve 816 may comprise a velocity check valve, and/or comprise an actuation mechanism coupled to the chamber 815, where the isolation valve 816 is actuated by a pressure signal from the chamber 815. A hose 818 is coupled to the pressure fitting 814 and extends to the surface. In some embodiments, the gas accumulator 850 is pre-charged at the surface to a pressure greater than the annulus hydrostatic pressure.

Under normal operation, the valve 800 includes a pass-through capability wherein hydraulic communication is allowed from the hose 806 to an "open" line 824 to open the subsea valve 882 as desired. Similarly, fluid communication is allowed from the hose 818, through the valve 810, and into the "close" line 834 to close the subsea valve 882 as desired. Upon an emergency or stress-inducing event that breaks the valve bodies 820, 830, a first, high pressure fluid path is established from the gas accumulator 850, through the fluid line 832, through the broken valve body 830, through the "close" line 834 and to the "close" side of the subsea valve 882. Similarly, a second, lower pressure fluid path is established from the annulus, through the annulus fluid line 822, through the broken valve body 820, through the "open" line 824 and to the "open" side of the subsea valve 882. The pressure differential will actuate the valve 882 closed. In some embodiments, the isolation valve 816, which may be integrated into the housing 200, is configured to be piloted closed when the stress reactive valve 810 is activated, thereby preventing the gas accumulator or source pressure from being dissipated through a hydraulic control line or large volume hydraulic passageway. In certain embodiments, the pressure across the valve 882 is equalized, such as by communicating the annulus pressure to both of the valve bodies 820, 830 and eliminating the gas accumulator 850. In such embodiments, the fail-safe close function can be achieved using a spring or other biasing member or mechanism in the valve 882 as discussed herein.

While the valve has generally been described with respect to a subsea application, it will be appreciated that the valve may also be used in other contexts. For example, the valve may be used in land based wellbores and/or wellheads. In an embodiment, the valve may be used in a land based wellhead to provide a safety function to surface and/or subsurface safety valves. In an embodiment, the valve may be used in surface housings to control one or more surface and/or subsurface safety valves. In an embodiment, the valve may be used in various pipelines, transmission lines, connection lines, or the like to control one or more safety and/or shutoff valves. For example, the frangible valve described herein may be used in an exposed portion of a pipeline at a road crossing to shutoff safety valves in the event that the exposed portion of the pipeline is bent or otherwise stressed.

In certain embodiments, a stress reactive valve as disclosed herein can activate an auxiliary fail-safe shutdown system, such as in industrial or manufacturing equipment, whereby the loss or gain of pressure from the broken valve initiates an electromechanical switch and the predetermined and automated fail-safe shutdown sequence will execute. In other embodiments, a stress reactive valve, integral to industrial construction or manufacturing equipment, for example, can act as a pass-through hydraulic line to an actuator or device that has the capability to create an unsafe condition or mechanical failure by virtue of its own hydraulic line pressure. If the hydraulic fluid is generating an unsafe stress condition within the equipment, the stress reactive valve can act as an additional fail-safe activation method, such as if a conventional hydraulic relief valve were to fail. In such embodiments, the stress reactive valve is used as an active internal monitor of a system's integrity rather than requiring an environmental disturbance or external input to the system.

ADDITIONAL DISCLOSURE

The following are nonlimiting, specific embodiments in accordance with the present disclosure:

Embodiment 1

In an embodiment, a subsea valve comprises a housing disposed in a subsea wellhead component; at least one chamber in the housing; a chamber inlet; a chamber outlet; and a valve body disposed in the chamber between the chamber inlet and the chamber outlet, wherein the valve body comprises a frangible material reactive to a stress in the housing.

Embodiment 2

The subsea valve of embodiment 1, wherein the stress comprises a bending stress, a torsional stress, a tensile stress, a shear stress, an impulse load, or a combination thereof in a string coupled to the subsea wellhead component.

Embodiment 3

The subsea valve of embodiment 1 or 2, wherein the chamber inlet is fluidly coupled to a high pressure fluid, and the chamber outlet is coupled to a hydraulic line of a valve in the subsea wellhead component.

Embodiment 4

The subsea valve of any of embodiments 1-3, wherein the chamber inlet is isolated from the chamber outlet by the valve body in a closed position, and the chamber inlet is exposed to the chamber outlet in an open position, wherein the valve body is broken in response to the stress in the open position.

Embodiment 5

The subsea valve of any of embodiments 1-4, wherein the valve body further comprises a reduced diameter portion.

Embodiment 6

The subsea valve of embodiment 5, wherein the reduced diameter portion is breakable in response to the stress.

Embodiment 7

The subsea valve of any of embodiments 1-6, wherein the valve body further comprises a stress concentration portion configured to break in response to the stress.

Embodiment 8

The subsea valve of any of embodiments 1-7, further comprising a pilot piston assembly coupled to the chamber outlet.

Embodiment 9

The subsea valve of embodiment 8, further comprising a piston shuttle valve assembly configured to receive a pilot pressure from the chamber outlet.

Embodiment 10

The subsea valve of embodiment 1, wherein the valve body further comprises a pass-through hydraulic line coupled to a valve in the subsea wellhead component.

Embodiment 11

In an embodiment, a valve comprises a housing; a plurality of valve bodies, wherein one or more of the plurality of valve bodies are captured in a chamber of each of a plurality of bores, wherein the bores are disposed in the housing, and wherein one or more of the valve bodies are breakable in response to a stress applied to the housing; a high pressure fluid line coupled to each chamber; and a valve hydraulic line coupled to each chamber of each of the plurality of bores and isolated from the high pressure fluid line by the valve body, and wherein the valve body comprises an open position when broken.

Embodiment 12

The valve of embodiment 11, wherein the valve body further comprises a reduced diameter stress concentration portion to receive the break in the open position.

Embodiment 13

The valve of embodiment 11 or 12, further comprising a pilot piston assembly coupled into the valve hydraulic line.

Embodiment 14

The valve of embodiment 13, further comprising a piston shuttle valve disposed between an atmospheric chamber and a source pressure.

Embodiment 15

In an embodiment, a method of actuating a valve comprises isolating a fluid line from a hydraulic valve line using a valve body, wherein the valve body is disposed in a housing; applying a stress to the valve body from the housing; breaking the valve body in response to the stress application; and establishing fluid communication between the fluid line and the hydraulic valve line through the break in the valve body.

Embodiment 16

The method of embodiment 15, further comprising closing a valve based on the fluid communication.

Embodiment 17

The method of embodiment 15 or 16, wherein the fluid communication provides a fluid flow from the hydraulic valve line into the fluid line.

Embodiment 18

The method of any of embodiments 15-17, further comprising creating a pressure differential across a valve using the fluid communication and an atmospheric chamber.

Embodiment 19

The method of any of embodiments 15-18, further comprising biasing a valve while equalizing a pressure across a valve using the fluid communication.

Embodiment 20

The method of any of embodiments 15-19, further comprising operating a pilot piston using a high pressure fluid provided by the fluid communication.

Embodiment 21

The method of embodiment 20, further comprising: exposing a valve in a subsea wellhead component to the high pressure fluid through the pilot piston; and closing the valve.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system comprising:
    a housing disposed in a subsea wellhead;
    at least one chamber in the housing;
    a chamber inlet;
    a chamber outlet; and
    a valve body disposed in the chamber between the chamber inlet and the chamber outlet, wherein the valve body comprises a frangible material reactive to an external stress applied to the housing, wherein the valve body comprises a reduced diameter portion that is breakable in response to the external stress applied to the housing.

2. The system of claim 1, wherein the external stress comprises a bending stress, a torsional stress, a tensile stress, a shear stress, an impulse load, or a combination thereof acting on a string coupled to the subsea wellhead.

3. The system of claim 1, wherein the chamber inlet is fluidly coupled to a high pressure fluid, and the chamber outlet is coupled to a hydraulic line of a valve in the subsea wellhead.

4. The system of claim 1, wherein the chamber inlet is isolated from the chamber outlet by the valve body in a closed position, and the chamber inlet is exposed to the chamber outlet in an open position, wherein the valve body is broken in response to the external stress applied to the housing in the open position.

5. The system of claim 1, wherein the valve body further comprises a stress concentration portion configured to break in response to the external stress applied to the housing.

6. The system of claim 1, further comprising a pilot piston assembly coupled to the chamber outlet.

7. The system of claim 6, further comprising a piston shuttle valve assembly configured to receive a pilot pressure from the chamber outlet.

8. The system of claim 1, wherein the valve body further comprises a pass-through hydraulic line coupled to a valve in the subsea wellhead.

9. The system of claim 1, further comprising:
    a subsea valve actuation assembly comprising the housing, chamber, chamber inlet, chamber outlet, and valve body; and
    a valve disposed in the subsea wellhead and fluidly coupled to the subsea valve actuation assembly;
    wherein the subsea valve actuation assembly maintains the valve in an open position when the chamber inlet and the chamber outlet are fluidly isolated from each other, and wherein the subsea valve actuation assembly actuates the valve from the open position to a closed position in response to fluid communication between the chamber inlet and the chamber outlet.

10. A system comprising:
    a housing;
    a plurality of valve bodies, wherein one or more of the plurality of valve bodies are captured in a chamber of each of a plurality of bores, wherein the bores are disposed in the housing, and wherein one or more of the valve bodies are breakable in response to an external stress applied to the housing;
    a high pressure fluid line coupled to each chamber; and
    a valve hydraulic line coupled to each chamber of each of the plurality of bores and isolated from the high pressure fluid line by the valve body, and wherein the valve body comprises an open position when broken.

11. The system of claim 10, wherein the valve body further comprises a reduced diameter stress concentration portion to receive the break in the open position.

12. The system of claim 10, further comprising a pilot piston assembly coupled into the valve hydraulic line.

13. The system of claim 12, further comprising a piston shuttle valve disposed between an atmospheric chamber and a source pressure.

14. The system of claim 10, further comprising:
a valve actuation assembly comprising the housing, plurality of valve bodies, high pressure fluid line, and valve hydraulic line; and
a valve fluidly coupled to valve actuation assembly;
wherein the valve actuation assembly maintains the valve in an open position when the high pressure fluid line and the valve hydraulic line are fluidly isolated from each other, and wherein the valve actuation assembly actuates the valve from the open position to a closed position in response to fluid communication between the high pressure fluid line and the valve hydraulic line.

15. A method of actuating a valve comprising:
isolating a fluid line from a hydraulic valve line using a valve body, wherein the valve body is disposed in a housing;
applying a stress to the valve body from the housing in response to the application of an external stress to the housing, wherein the valve body comprises a reduced diameter portion that is breakable in response to the external stress applied to the housing;
breaking the reduced diameter portion of the valve body in response to the stress application; and
establishing fluid communication between the fluid line and the hydraulic valve line through the break in the valve body.

16. The method of claim 15, further comprising closing a valve based on the fluid communication.

17. The method of claim 15, wherein the fluid communication provides a fluid flow from the hydraulic valve line into the fluid line.

18. The method of claim 15, further comprising creating a pressure differential across a valve using the fluid communication and an atmospheric chamber.

19. The method of claim 15, further comprising biasing a valve while equalizing a pressure across a valve using the fluid communication.

20. The method of claim 15, further comprising:
operating a pilot piston using a high pressure fluid provided by the fluid communication;
exposing a valve in a subsea wellhead component to the high pressure fluid through the pilot piston; and
closing the valve.

* * * * *